(12) United States Patent
Parker

(10) Patent No.: US 8,656,717 B1
(45) Date of Patent: Feb. 25, 2014

(54) SOLAR POWERED GENERATOR ASSEMBLY

(76) Inventor: Robert M. Parker, Mississauga (CA)

( * ) Notice: Subject to any disclaimer, the term of this patent is extended or adjusted under 35 U.S.C. 154(b) by 369 days.

(21) Appl. No.: 13/240,323

(22) Filed: Sep. 22, 2011

(51) Int. Cl.
| F03G 6/00 | (2006.01) |
| B60L 8/00 | (2006.01) |
| F24J 2/04 | (2006.01) |
| F24J 2/30 | (2006.01) |
| F24J 2/34 | (2006.01) |
| F24J 2/10 | (2006.01) |
| F24J 2/12 | (2006.01) |
| F24J 2/08 | (2006.01) |
| F03G 7/00 | (2006.01) |

(52) U.S. Cl.
USPC ....... 60/641.15; 60/641.8; 126/645; 126/683; 126/689; 126/690; 126/698; 126/642

(58) Field of Classification Search
USPC ................. 126/645, 683, 689, 693, 642, 698; 60/641.15, 641.8
See application file for complete search history.

(56) References Cited

U.S. PATENT DOCUMENTS

| 761,596 | A | * | 5/1904 | Moss | 126/646 |
| 2,213,894 | A | * | 9/1940 | Barry | 126/592 |
| 3,182,654 | A | * | 5/1965 | Culling | 126/600 |
| 3,892,433 | A | | 7/1975 | Blake | |
| 3,905,352 | A | * | 9/1975 | Jahn | 126/578 |
| 3,927,659 | A | * | 12/1975 | Blake et al. | 126/643 |
| 3,998,205 | A | * | 12/1976 | Scragg et al. | 126/609 |
| 4,038,557 | A | * | 7/1977 | Gildersleeve et al. | 290/1 R |
| 4,043,315 | A | * | 8/1977 | Cooper | 126/591 |
| 4,056,093 | A | * | 11/1977 | Barger | 126/592 |
| 4,106,479 | A | * | 8/1978 | Rogers | 126/687 |
| 4,116,223 | A | * | 9/1978 | Vasilantone | 126/643 |
| 4,170,985 | A | * | 10/1979 | Authier | 126/689 |
| 4,191,164 | A | | 3/1980 | Kelly | |
| 4,198,826 | A | | 4/1980 | Chromie | |
| D255,482 | S | | 6/1980 | Trautner | |
| 4,206,746 | A | * | 6/1980 | Chubb | 126/651 |
| 4,229,941 | A | * | 10/1980 | Hope | 60/641.15 |
| 4,267,826 | A | * | 5/1981 | Hitt, Jr. | 126/647 |
| 4,280,482 | A | * | 7/1981 | Nilsson, Sr. | 126/618 |
| 4,299,275 | A | * | 11/1981 | Robinson, Jr. | 165/104.14 |
| 4,355,628 | A | * | 10/1982 | Watts | 126/609 |
| 4,397,294 | A | * | 8/1983 | Mancebo | 126/597 |
| 4,422,434 | A | * | 12/1983 | Statz et al. | 126/634 |
| 4,459,970 | A | | 7/1984 | Clee | |
| 4,644,933 | A | | 2/1987 | Gregory | |
| 4,893,612 | A | * | 1/1990 | Dawson | 126/689 |
| 5,632,147 | A | | 5/1997 | Greer | |

(Continued)

FOREIGN PATENT DOCUMENTS

| JP | 56077642 A | * | 6/1981 |
| JP | 58092753 A | * | 6/1983 |

*Primary Examiner* — Thomas Denion
*Assistant Examiner* — Jessica Kebea

(57) ABSTRACT

A solar powered generator assembly is provided for driving a turbine using steam produced by solar power. The assembly includes a fluid tank and a fluid line having a first end and a second end each in fluid communication with the fluid tank. A fluid is positioned in the fluid tank and the fluid line. A lens focuses solar rays into a heat collector coupled to the lens. The heat collector has a reflective curved interior surface configured for reflecting solar rays to facilitate heating the heat collector. A medial portion of the fluid line is wrapped around and heated by the heat collector converting the fluid into a gaseous state. A turbine is operationally coupled to the fluid line driving the turbine to produce electrical current.

13 Claims, 5 Drawing Sheets

(56) References Cited

U.S. PATENT DOCUMENTS

| | | |
|---|---|---|
| 6,434,942 B1 | 8/2002 | Charlton |
| 6,550,248 B1 | 4/2003 | Sangster et al. |
| 7,137,179 B2 | 11/2006 | Yokouchi et al. |
| 2007/0221210 A1* | 9/2007 | Polk .............................. 126/701 |
| 2009/0178348 A1* | 7/2009 | Flaherty ........................ 52/81.1 |
| 2010/0192944 A1* | 8/2010 | Gruber ........................... 126/698 |
| 2012/0260910 A1* | 10/2012 | Martin-Lopez ............... 126/698 |

* cited by examiner

SOLAR POWERED GENERATOR ASSEMBLY

BACKGROUND OF THE DISCLOSURE

Field of the Disclosure

The disclosure relates to generator devices and more particularly pertains to a new generator device for driving a turbine using steam produced by solar power.

SUMMARY OF THE DISCLOSURE

An embodiment of the disclosure meets the needs presented above by generally comprising a fluid tank and a fluid line having a first end and a second end each in fluid communication with the fluid tank. A fluid is positioned in the fluid tank and the fluid line. A lens focuses solar rays into a heat collector coupled to the lens. The heat collector has a reflective curved interior surface configured for reflecting solar rays to facilitate heating the heat collector. A medial portion of the fluid line is wrapped around and heated by the heat collector converting the fluid into a gaseous state. A turbine is operationally coupled to the fluid line driving the turbine to produce electrical current.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
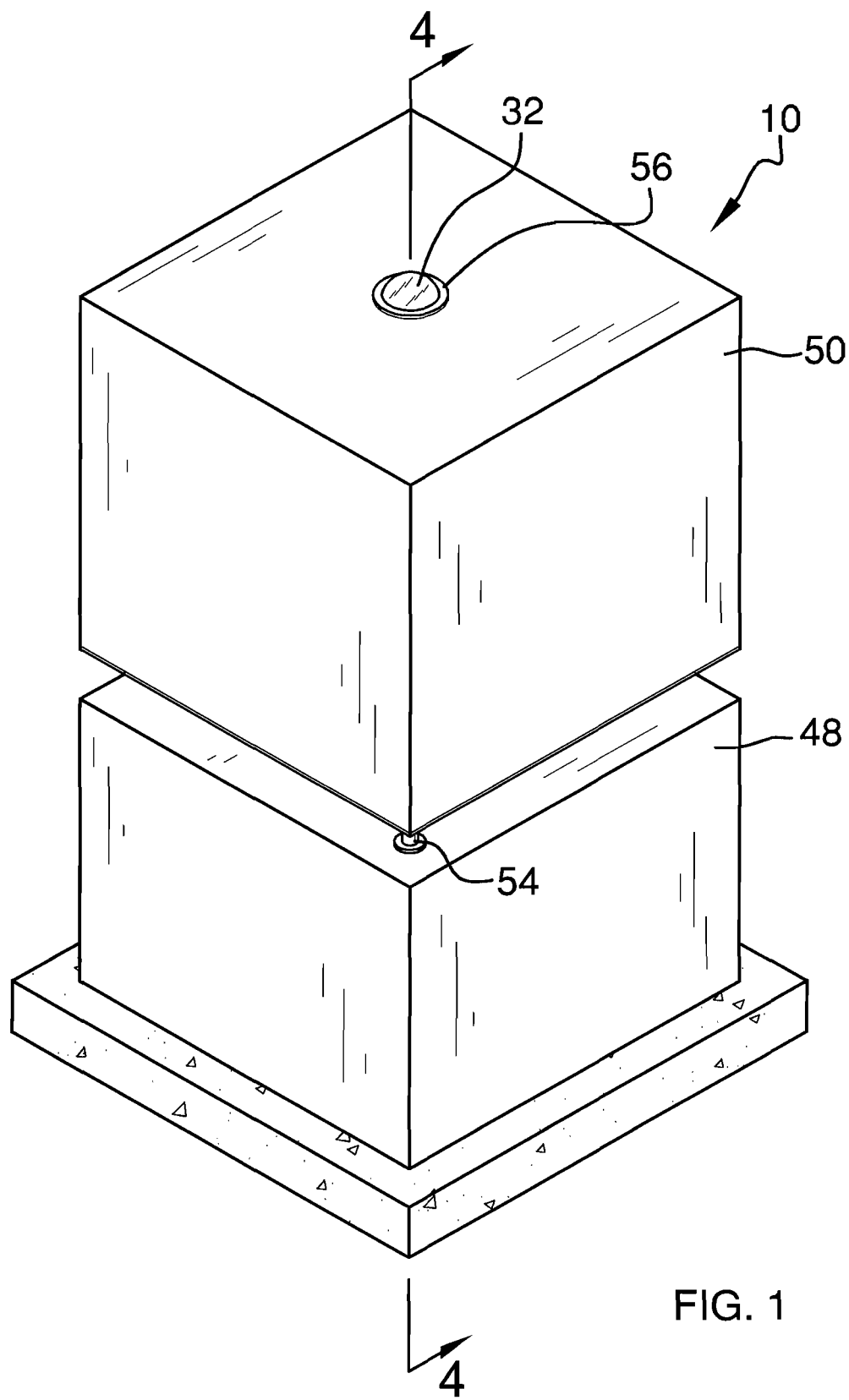
FIG. 1 is a top front side perspective view of a solar powered generator assembly according to an embodiment of the disclosure.
Figure 2:
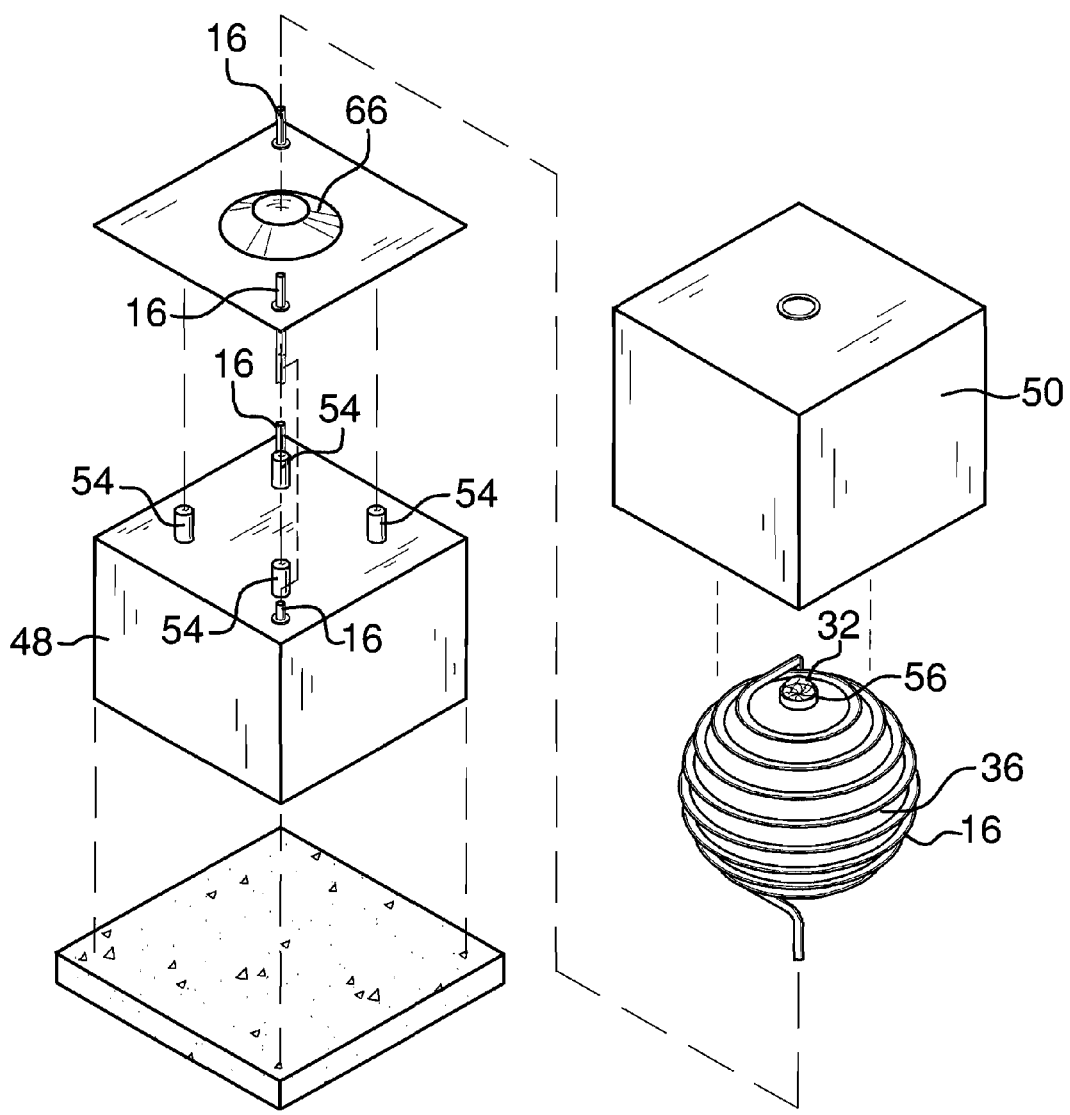
FIG. 2 is an exploded top front side perspective view of an embodiment of the disclosure.
Figure 3:
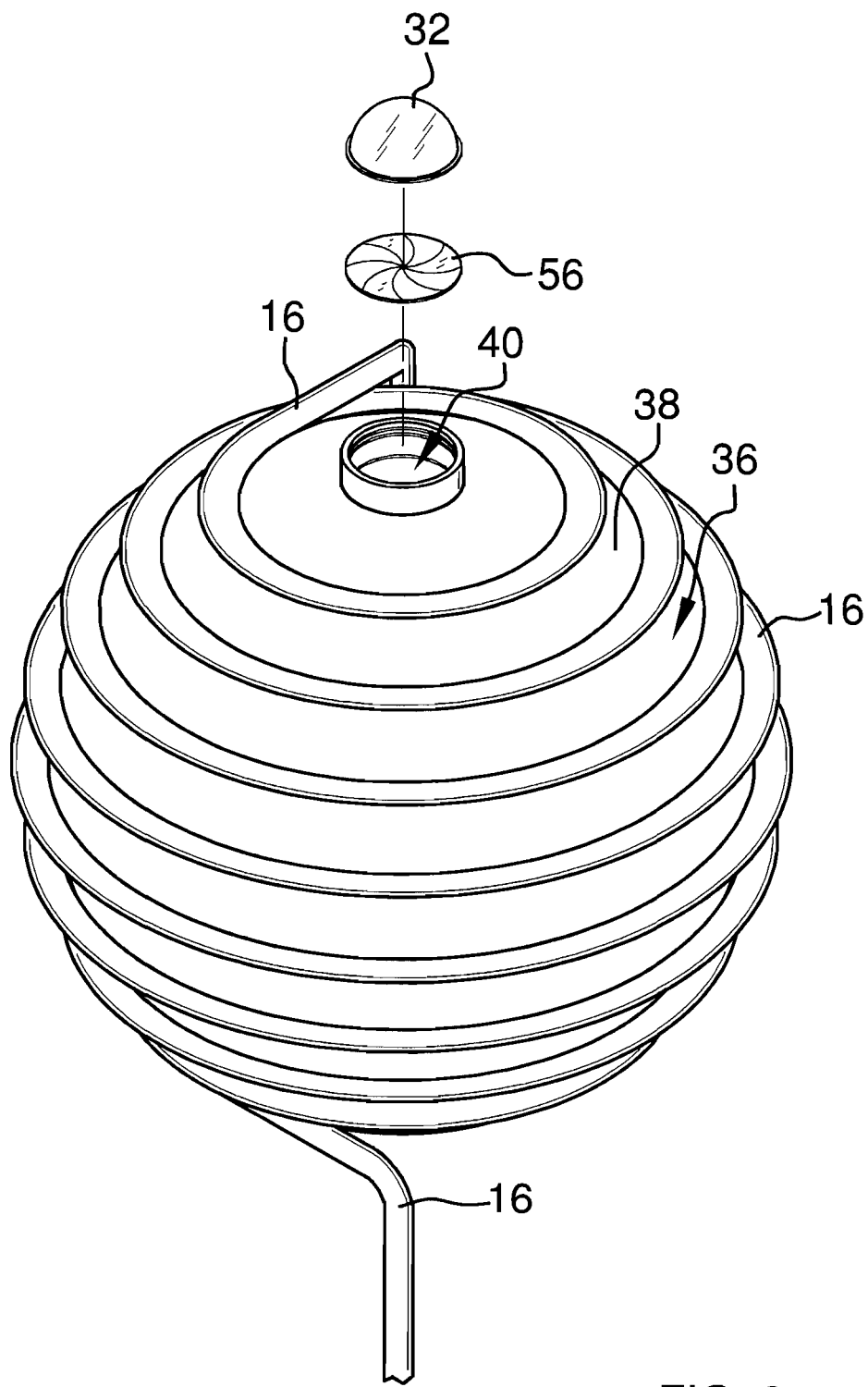
FIG. 3 is a partially exploded top front side perspective view of an embodiment of the disclosure.
Figure 4:
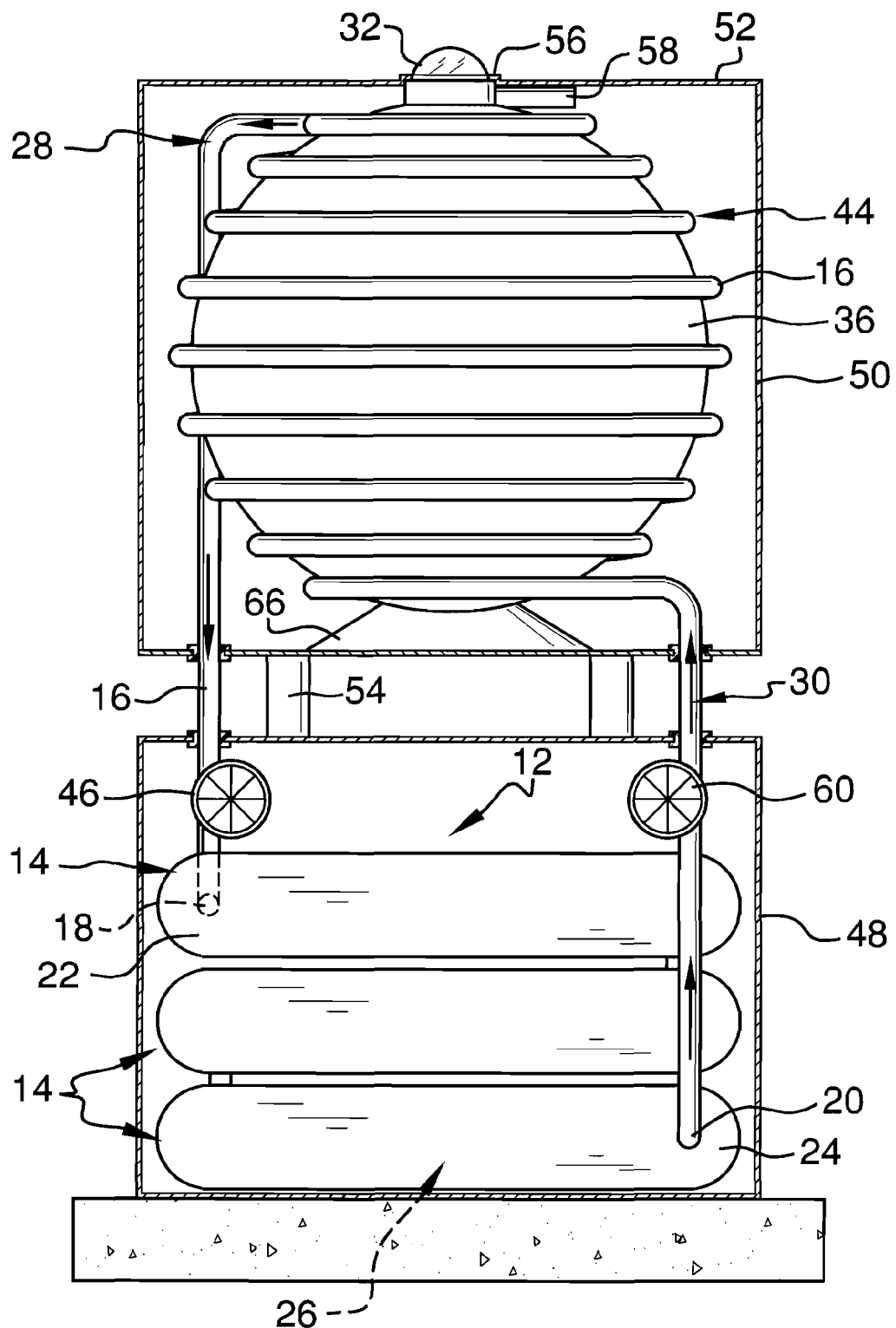
FIG. 4 is a cross-sectional view of an embodiment of the disclosure taken along line 4-4 of FIG. 1.
Figure 5:
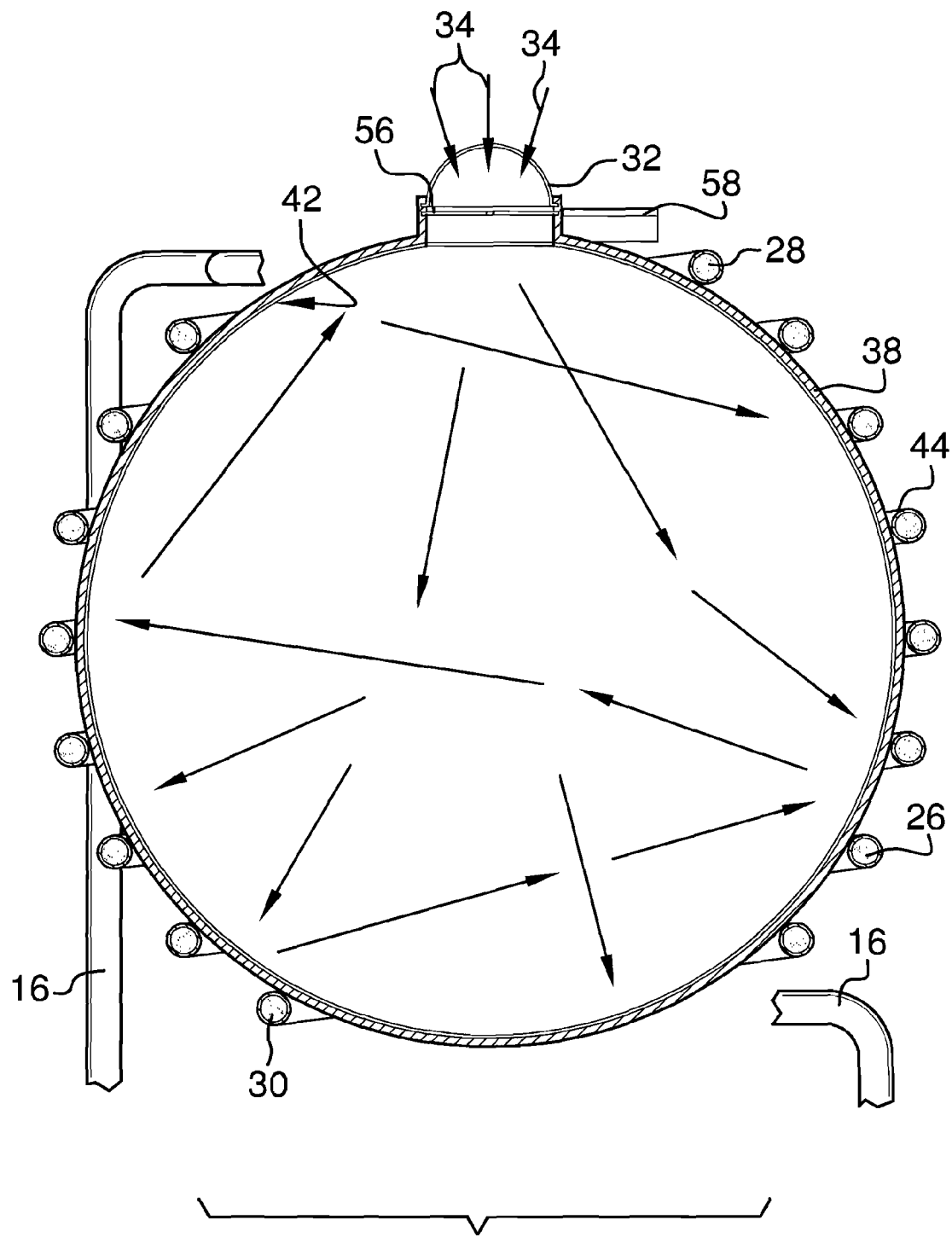
FIG. 5 is a cross-sectional view of an embodiment of the disclosure taken along line 5-5 of FIG. 4.

With reference now to the drawings, and in particular to FIGS. 1 through 5 thereof, a new generator device embodying the principles and concepts of an embodiment of the disclosure and generally designated by the reference numeral 10 will be described.

As best illustrated in FIGS. 1 through 5, the solar powered generator assembly 10 generally comprises a fluid tank 12 having a plurality of chambers 14. A fluid line 16 includes a first end 18 in fluid communication with the fluid tank 12 and a second end 20 also in fluid communication with the fluid tank 12. The first end 18 of the fluid line 16 is coupled to an upper chamber 22 of the fluid tank 12. The second end 20 of the fluid line 16 is coupled to a lower chamber 24 of the fluid tank 12. A fluid 26 is positioned in the fluid tank 12 and the fluid line 16. The chambers 14 may be elongated and coupled together sequentially in fluid communication whereby the fluid 26 traverses lengthwise across each chamber 14 through the fluid tank 12 to enhance cooling and facilitate condensation of the fluid 26 from a gaseous state 28 to a liquid state 30.

A lens 32 is configured for collecting and focusing solar rays 34. A spherical heat collector 36 is coupled to the lens 32. The heat collector 36 includes a perimeter wall 38 defining an interior space 40. The heat collector 36 includes a curved interior surface 42. The curved interior surface 42 is reflective and may be constructed of a reflective polyester film material. Thus, the interior surface 42 is configured for reflecting solar rays 34 passing through the lens 32 whereby the heat collector 36 is heated. A medial portion 44 of the fluid line 16 is wrapped around the heat collector 36 in a serpentine or spiral configuration such that the fluid 26 in the fluid line 16 is heated and converted into the gaseous state 28 when the fluid 26 is positioned in the medial portion 44 of the fluid line 16.

A turbine 46 is operationally coupled to the fluid line 16 whereby the heated fluid 26 in the gaseous state 28 passes through the fluid line 16 driving the turbine 46 to produce electrical current. The electrical current may be collected and delivered to perform work as desired in a conventionally known manner. The turbine 46 is coupled to the fluid line 16 proximate the first end 18 of the fluid line 16.

A lower housing 48 protects and insulates the fluid tank 12 which is positioned in the lower housing 48. The turbine 46 is also positioned in the lower housing 48. An upper housing 50 is provided. The lens 32 is coupled to an upper surface 52 of the upper housing 50 and the heat collector 36 is positioned inside the upper housing 50. A sphere holder 66 may be positioned in the lower housing 48 to prevent movement of the spherical heat collector 36 within the lower housing 48. The upper housing 50 is designed to insulate the heat collector 36 and medial portion 44 of the fluid line 16. A plurality of supports 54 is coupled to and extends between the upper housing 50 and the lower housing 48. Thus, the upper housing 50 and the lower housing 48 are positioned in spaced relationship to further promote a temperature difference between the upper housing 50 and the lower housing 48 facilitating conversion of the fluid 26 between the gaseous state 28 and the liquid state 30.

An adjustable aperture 56 is coupled to the lens 32. The aperture is operationally coupled to the lens 32 for adjusting an amount of light passing through the lens 32. A temperature gauge 58 is coupled to the heat collector 36 to measure a temperature of the heat collector 36. The gauge 58 is operationally coupled to the aperture 56 to adjust the size of the aperture 56 for maintaining the temperature of the heat collector 36 within a pre-determined temperature range preventing overheating and promoting maximum heating in lower light conditions.

A secondary turbine 60 may be coupled to the fluid line 16 proximate the second end 20 of the fluid line 16. The secondary turbine 60 is operationally coupled to the fluid line 16 such that the fluid 26 in the liquid state 30 drives the secondary turbine 60 as it moves towards the medial portion 44 of the fluid line 16. The secondary turbine 60 may be positioned in the lower housing 48. The lower housing 48 may be supported on a concrete slab.

In use, usable electrical current is produced by driving the turbine 46 and the secondary turbine 60 using the fluid 26 heated by solar rays 34 passing through the lens 32 into the heat collector 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A solar powered generator assembly comprising:
    a fluid tank;
    a fluid line having a first end in fluid communication with said fluid tank, said fluid line having a second end in fluid communication with said fluid tank;
    a fluid positioned in said fluid tank and said fluid line;
    a lens configured for collecting and focusing solar rays;
    a heat collector coupled to said lens, said heat collector having a perimeter wall defining an interior space, said heat collector having a curved interior surface, said curved interior surface being reflective whereby said interior surface is configured for reflecting solar rays passing through said lens whereby said heat collector is heated;
    a medial portion of said fluid line being wrapped around said heat collector whereby said fluid in said fluid line is heated and converted into a gaseous state when said fluid is positioned in said medial portion of said fluid line; and
    a turbine operationally coupled to said fluid line whereby said heated fluid passes through said fluid line driving said turbine to produce electrical current.

2. The assembly of claim 1, further including a lower housing, said fluid tank being positioned in said lower housing.

3. The assembly of claim 1, further including an upper housing, said lens being coupled to said upper housing and said heat collector being positioned inside said upper housing.

4. The assembly of claim 1, further including said heat collector being spherical.

5. The assembly of claim 1, further including an adjustable aperture coupled to said lens, said aperture being operationally coupled to said lens for adjusting an amount of light passing through said lens.

6. The assembly of claim 5, further including a temperature gauge coupled to said heat collector to measure a temperature of said heat collector, said gauge being operationally coupled to said aperture whereby said gauge is configured for maintaining the temperature of said heat collector within a pre-determined temperature range.

7. The assembly of claim 1, further including said fluid tank having a plurality of chambers.

8. The assembly of claim 7, further including said chambers being coupled together in sequential fluid communication whereby said fluid tank facilitates condensation of said fluid from said gaseous state to a liquid state.

9. The assembly of claim 1, further including said first end of said fluid line being coupled to an upper chamber of said fluid tank.

10. The assembly of claim 1, further including said second end of said fluid line being coupled to a lower chamber of said fluid tank.

11. The assembly of claim 1, further including said turbine being coupled to said fluid line proximate said first end of said fluid line.

12. The assembly of claim 11, further including a secondary turbine coupled to said fluid line proximate said second end of said fluid line, said secondary turbine being operationally coupled to said fluid line whereby said fluid drives said secondary turbine.

13. A solar powered generator assembly comprising:
    a fluid tank, said fluid tank having a plurality of chambers;
    a fluid line having a first end in fluid communication with said fluid tank, said fluid line having a second end in fluid communication with said fluid tank, said first end of said fluid line being coupled to an upper chamber of said fluid tank, said second end of said fluid line being coupled to a lower chamber of said fluid tank;
    a fluid positioned in said fluid tank and said fluid line, said chambers being coupled together in sequential fluid communication whereby said fluid tank facilitates condensation of said fluid from a gaseous state to a liquid state;
    a lens configured for collecting and focusing solar rays;
    a spherical heat collector coupled to said lens, said heat collector having a perimeter wall defining an interior space, said heat collector having a curved interior surface, said curved interior surface being reflective whereby said interior surface is configured for reflecting solar rays passing through said lens whereby said heat collector is heated;
    a medial portion of said fluid line being wrapped around said heat collector whereby said fluid in said fluid line is heated and converted into said gaseous state when said fluid is positioned in said medial portion of said fluid line;
    a turbine operationally coupled to said fluid line whereby said heated fluid passes through said fluid line driving said turbine to produce electrical current, said turbine being coupled to said fluid line proximate said first end of said fluid line;
    a lower housing, said fluid tank being positioned in said lower housing, said turbine being positioned in said lower housing;
    an upper housing, said lens being coupled to an upper surface of said upper housing and said heat collector being positioned inside said upper housing;
    a plurality of supports coupled to and extending between said upper housing and said lower housing whereby said upper housing and said lower housing are positioned in spaced relationship;
    an adjustable aperture coupled to said lens, said aperture being operationally coupled to said lens for adjusting an amount of light passing through said lens;
    a temperature gauge coupled to said heat collector to measure a temperature of said heat collector, said gauge being operationally coupled to said aperture whereby said gauge is configured for maintaining the temperature of said heat collector within a pre-determined temperature range; and
    a secondary turbine coupled to said fluid line proximate said second end of said fluid line, said secondary turbine being operationally coupled to said fluid line whereby said fluid drives said secondary turbine, said secondary turbine being positioned in said lower housing.

* * * * *